United States Patent
Tomikawa et al.

(10) Patent No.: US 9,865,879 B2
(45) Date of Patent: Jan. 9, 2018

(54) BINDER FOR LITHIUM ION BATTERY ELECTRODE, PASTE FOR LITHIUM ION BATTERY NEGATIVE ELECTRODE, AND METHOD FOR PRODUCING LITHIUM ION BATTERY NEGATIVE ELECTRODE

(75) Inventors: Masao Tomikawa, Otsu (JP); Tomoyuki Yuba, Otsu (JP); Natsuko Chayama, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 13/990,106

(22) PCT Filed: Nov. 28, 2011

(86) PCT No.: PCT/JP2011/077308
§ 371 (c)(1),
(2), (4) Date: May 29, 2013

(87) PCT Pub. No.: WO2012/073853
PCT Pub. Date: Jun. 7, 2012

(65) Prior Publication Data
US 2013/0260020 A1    Oct. 3, 2013

(30) Foreign Application Priority Data

Nov. 30, 2010  (JP) ................................ 2010-266429

(51) Int. Cl.
*H01M 4/62*      (2006.01)
*H01M 4/02*      (2006.01)
*H01M 4/04*      (2006.01)
*H01M 4/134*     (2010.01)
*H01M 4/1395*    (2010.01)
*H01M 4/38*      (2006.01)
*H01M 10/0525*   (2010.01)

(52) U.S. Cl.
CPC ........... *H01M 4/622* (2013.01); *H01M 4/134* (2013.01); *H01M 4/1395* (2013.01); *H01M 4/386* (2013.01); *H01M 4/387* (2013.01); *H01M 10/0525* (2013.01); *Y02T 10/7011* (2013.01)

(58) Field of Classification Search
None
See application file for complete search history.

(56) References Cited

U.S. PATENT DOCUMENTS

| 6,083,426 A   * | 7/2000  | Shimasaki ............... H01B 1/22 252/500 |
| 2006/0127686 A1* | 6/2006  | Meloni ..................... 428/473.5 |
| 2006/0172196 A1* | 8/2006  | Fukunaga ............. H01M 4/134 429/232 |
| 2007/0072077 A1* | 3/2007  | Kusumoto et al. ........ 429/218.1 |
| 2007/0224508 A1  | 9/2007  | Aramata et al. |
| 2009/0246632 A1  | 10/2009 | Fukui et al. |
| 2011/0139331 A1* | 6/2011  | Arora .................... H01M 2/162 156/62.2 |

FOREIGN PATENT DOCUMENTS

| JP | 2007-294423 A | 11/2007 |
| JP | 2009-185204 A | 8/2009 |
| JP | 2009-199761 A | 9/2009 |
| JP | 2009-238659 A | 10/2009 |
| JP | 2009-245773 A | 10/2009 |
| WO | WO 2010/113991 A1 | 10/2010 |

OTHER PUBLICATIONS

Manea, High Solid Binders, Vincentz, 1st Edition, (Jan. 15, 2009). pp. 25-26.*
International Search Report for PCT/JP2011/077308 dated Feb. 7, 2012.
Written Opinion of the International Searching Authority for PCT/JP2011/077308 dated Feb. 7, 2012 (Japanese).

* cited by examiner

*Primary Examiner* — Lisha Jiang
(74) *Attorney, Agent, or Firm* — Birch, Stewart, Kolasch & Birch, LLP

(57) ABSTRACT

The present invention is directed to a binder for a lithium ion battery electrode, comprising a polyimide precursor having a tetracarboxylic acid residue and a diamine residue and/or a polyimide, the polyimide precursor having a residue of a tetracarboxylic dianhydride selected from those represented by the following general formulas (1) and (2) as the tetracarboxylic acid residue, and a residue of a diamine selected from those represented by the following general formulas (3) and (4) as the diamine residue, the content of the acid residue being from 0.90 to 0.95 moles based on 1 mole of the diamine residue.

7 Claims, No Drawings

BINDER FOR LITHIUM ION BATTERY ELECTRODE, PASTE FOR LITHIUM ION BATTERY NEGATIVE ELECTRODE, AND METHOD FOR PRODUCING LITHIUM ION BATTERY NEGATIVE ELECTRODE

TECHNICAL FIELD

The present invention relates to a binder for a lithium ion battery electrode, a paste for a lithium ion battery negative electrode using the same, and a method for producing a lithium ion battery negative electrode.

BACKGROUND ART

A lithium ion battery, as a chargeable high capacity battery, enabled an electronic device to have a higher function and to operate over a long time. Furthermore, the lithium ion battery is installed in vehicles and is considered as a promising battery of hybrid vehicles and electric vehicles. The lithium ion battery, which is now used widely, includes an active material such as lithium cobaltate; a positive electrode formed by applying a paste containing a binder such as polyvinylidene fluoride (PVDF) on an aluminum foil; and a negative electrode formed by applying a paste containing a carbon based active material and a binder such as PVDF or a styrene-butadiene-rubber (SBR) on a copper foil.

In order to further increase a capacity of the lithium ion battery, use of silicon, germanium or tin as a negative electrode active material has been studied (see, for example, Patent Literature 1). Since the negative electrode active material using silicon, germanium or tin can receive lots of lithium ions, the active material undergoes a large change in volume between the time when sufficient charging is performed and the time when sufficient discharging is performed, and thus it is impossible for the binder such as PVDF or SBR to follow the change in volume of the active material. Therefore, use of a polyimide resin having more excellent mechanical characteristics as a binder of a negative electrode has been studied (see, for example, Patent Literature 2).

Use of such novel high capacity active material may often cause discharging of electricity only in the quantity smaller than that in the case of charging, when discharging is performed after initial charging. Therefore, a study is now made on a method in which an improvement is made by adding lithium first (see, for example, Patent Literature 3).

There is also a problem that use of a polyimide resin as a binder causes low first time efficiency. To cope with the problem, there is disclosure that use of a mixture of two kinds of polyimide resins each having a different molecular weight, for example, a polyimide resin having a molecular weight of less than 100,000 and a polyimide resin having a molecular weight of 100,000 or more and less than 200,000, enables the production of a binder capable of maintaining point binding properties and strength, and thus increasing initial efficiency without causing deterioration of current collection characteristics (see, for example, Patent Literature 4).

CITATION LIST

Patent Literature

[Patent Literature 1] JP 2009-199761 A
[Patent Literature 2] JP 2009-245773 A
[Patent Literature 3] JP 2007-294423 A
[Patent Literature 4] JP 2009-238659 A

SUMMARY OF INVENTION

Technical Problem

An object of the present invention is to provide a binder for a lithium ion battery electrode, which exhibits high initial efficiency.

Solution to Problem

The present invention is directed to a binder for a lithium ion battery electrode, comprising a polyimide precursor having a tetracarboxylic acid residue and a diamine residue and/or a polyimide, the polyimide precursor having a residue of a tetracarboxylic dianhydride selected from those represented by the following general formulas (1) and (2) as the tetracarboxylic acid residue, and a residue of a diamine selected from those represented by the following general formulas (3) and (4) as the diamine residue, the content of the acid residue being from 0.90 to 0.95 moles based on 1 mole of the diamine residue:

[Chemical Formula 1]

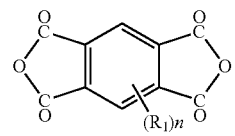

(1)

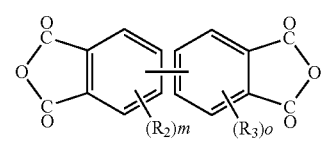

(2)

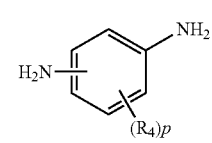

(3)

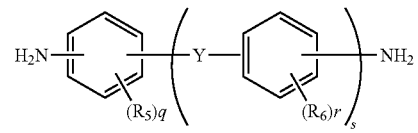

(4)

wherein $R^1$ to $R^6$ in the general formulas (1) to (4) may be respectively the same or different and represent a group selected from an alkyl group having 1 to 4 carbon atoms, a fluoroalkyl group having 1 to 4 carbon atoms, an alkoxyl group having 1 to 4 carbon atoms, a phenyl group, and a phenyl group in which at least one of hydrogen atoms is substituted with an alkyl group having 1 to 10 carbon atoms; Y represents a direct bond, or a group selected from an alkylene group having 1 to 10 carbon atoms, a fluoroalkylene group, a cycloalkylene group having 4 to 10 carbon atoms, a fluorocycloalkylene group, a carbonyl group, an ester group, an amide group, a sulfide group, an ether group and a sulfonyl group; n is an integer of from 0 to 2; m and o are respectively integers of from 0 to 3; p, q and r are respectively integers of from 0 to 4; and s is an integer of from 1 to 4.

The present invention also includes a paste for a lithium ion battery negative electrode, comprising the above binder for a lithium ion battery electrode, and a negative electrode active material containing one or more atoms selected from a silicon atom, a tin atom and a germanium atom.

The present invention also includes a method for producing a lithium ion battery negative electrode, which comprises applying the above paste for a lithium ion battery negative electrode on a metal foil in a thickness of 1 to 100 μm, followed by subjecting to a heat treatment at 100 to 500° C. for 1 minute to 24 hours.

Advantageous Effects of Invention

Use of the binder for a lithium ion battery electrode of the present invention may enable an improvement in initial efficiency of a lithium ion battery. Particularly, even in the case of using a negative electrode active material containing one or more atoms selected from a silicon atom, a tin atom and a germanium atom, high initial efficiency can be obtained.

DESCRIPTION OF EMBODIMENTS

The binder for a lithium ion battery electrode of the present invention (hereinafter may be referred to as a binder) is/are a polyimide precursor having a tetracarboxylic acid residue and a diamine residue and/or a polyimide.

The respective resins will be described below.

The polyimide is a polymer having a tetracarboxylic acid residue and a diamine residue, which is obtained by ring-closing of the below-mentioned polyimide precursor through a heat treatment or a chemical treatment. It is possible to preferably use a polyamideimide containing an amide bond in a part of the main chain of a polyimide.

The polyimide precursor refers to a resin which can be converted into a polyimide through a heat treatment or a chemical treatment. Examples of the polyimide precursor include poly(amic acid), poly(amic acid) ester, polyisoimide and the like. The poly(amic acid) is a polymer having a tetracarboxylic acid residue and a diamine residue, which can be obtained by polymerizing a tetracarboxylic dianhydride with a diamine. The poly(amic acid) ester is a polymer having a dicarboxylic acid diester residue and a diamine residue, which can be obtained by polymerizing a dicarboxylic acid diester with a diamine, or reacting a carboxyl group of a poly(amic acid) with an esterification reagent. Examples of the esterification reagent include an acetal compound such as dimethylformamide dialkyl acetal, dihydropyran, halogenated alkyl, vinyl ether and the like. The polyisoimide is a polymer having a diisoimide residue and a diamine residue, which is obtained by dehydration ring-closing of poly(amic acid) using dicyclohexylcarbodiimide or trifluoroacetic anhydride.

The tetracarboxylic dianhydride used for the production of the polyimide precursor used in the present invention is selected from tetracarboxylic dianhydrides represented by the general formulas (1) and (2). Examples of the tetracarboxylic dianhydride include pyromellitic anhydride, biphenyltetracarboxylic dianhydride and the like. Of these tetracarboxylic dianhydrides, tetracarboxylic dianhydride represented by the general formula (2) is particularly preferable. Specific examples thereof include biphenyltetracarboxylic dianhydride and the like.

It is possible to use, as the other tetracarboxylic dianhydride, benzophenonetetracarboxylic dianhydride, diphenyl ether tetracarboxylic dianhydride, diphenylsulfonetetracarboxylic dianhydride, hexafluoropropylidenebis(phthalic anhydride) and the like. It is also possible to use aliphatic tetracarboxylic dianhydrides such as cyclobutanetetracarboxylic dianhydride, butanetetracarboxylic dianhydride, cyclopentanetetracarboxylic dianhydride, cyclohexanetetracarboxylic dianhydride, and naphthalenetetracarboxylic dianhydride.

In place of these tetracarboxylic dianhydrides, a dicarboxylic acid diester or tetracarboxylic acid having the same basic skeleton can also be used.

The components derived from tetracarboxylic dianhydride, dicarboxylic acid diester and tetracarboxylic acid composes a tetracarboxylic acid residue of poly(amic acid), a dicarboxylic acid diester residue of poly(amic acid) ester, and a diisoimide residue of polyisoimide, respectively. Hereinafter, a tetracarboxylic dianhydride residue, a tetracarboxylic acid residue, a dicarboxylic acid diester residue, and a diisoimide residue are collectively called a specific acid residue.

The polyimide or polyimide precursor may have a residue of a tricarboxylic acid such as trimellitic acid or tritrimesic acid, or a residue of a dicarboxylic acid such as phthalic acid, naphthalenedicarboxylic acid, adipic acid, hexamethylenedicarboxylic acid, or cyclohexanedicarboxylic acid, together with the above specific acid residue. The content of a residue other than these specific acid residues in the polyimide or polyimide precursor is preferably 50 moles or less based on 100 moles of the specific acid residue.

The diamine used for the production of the polyimide precursor used in the present invention is selected from diamines represented by the general formulas (3) and (4). Examples of the diamine include phenylenediamine having one aromatic ring, and alkyl group-substituted phenylenediamines such as diaminotoluene, diaminoxylene and diaminoethylbenzene; diaminodiphenylmethane, diaminodiphenyl ether, diaminodiphenyl sulfide, diaminodiphenylsulfone, benzidine, diaminobenzanilide and 2,2-bis(4-aminophenyl)hexafluoropropane, each having two aromatic rings; 1,4-bis[1-(4-aminophenyl)-1-methylethyl]benzene and bis(aminophenoxy)benzene, each having three aromatic rings; bis(aminophenoxyphenyl)sulfone bis(aminophenoxyphenyl)propane and bis(aminophenoxyphenyl), each having four aromatic rings; or those in which at least one of hydrogen atoms of aromatic ring(s) of these diamines is substituted with a group selected from an alkyl group having 1 to 4 carbon atoms, a fluoroalkyl group having 1 to 4 carbon atoms, an alkoxyl group having 1 to 4 carbon atoms, a phenyl group, and a phenyl group in which at least one hydrogen atom is substituted with an alkyl group having 1 to 10 carbon atoms.

It is possible to use aliphatic diamines such as ethylenediamine, propanediamine, butanediamine, pentanediamine, hexanediamine, heptanediamine, octanediamine, diaminoethylene glycol, diaminopropylene glycol, diaminopolyethylene glycol, diaminopolypropylene glycol, cyclopentyldiamine, and cyclohexyldiamine, in the amount within a range from 1 to 50% by weight in the whole diamine component.

It is also possible to use silicon-containing diamines such as 1,3-bis(3-aminopropyl)tetramethyldisiloxane, 1,3-bis(3-aminopropyl)tetraethyldisiloxane, 1,3-bis(3-aminopropyl)tetramethoxydisiloxane, 1,3-bis(3-aminopropyl)tetrapropyldisiloxane, 1,3-bis(3-aminopropyl) dimethyldiphenyldisiloxane, 1,3-bis(3-aminopropyl) trimethylhydrodisiloxane, bis(4-aminophenyl) tetramethyldisiloxane, 1,3-bis(4-aminophenyl) tetraphenyldisiloxane, α,ω-bis(3-aminopropyl)

hexamethyltrisiloxane, α,ω-bis(3-aminopropyl)permethylpolysiloxane, 1,3-bis(3-aminopropyl)tetraphenyldisiloxane, and 1,5-bis(2-aminoethyl)tetraphenyldimethyltrisiloxane, in the amount within a range from 1 to 30% by weight in the whole diamine component. Modification with the silicon-containing diamine may enable an improvement in adhesion to silicon.

In the present invention, an amino group is formed at the end of the polyimide and the polyimide precursor by adjusting the amount of the acid residue within a range from 0.90 to 0.95 moles based on 1 mole of the diamine residue. Since the amino group behaves similarly to cations and thus becomes less likely to allow Li ions to come near a binder, initial efficiency is improved and also charge/discharge cycle characteristics are improved. On the other hand, when the amount of the acid dianhydride residue decreases to less than 0.90 mole based on 1 mole of the diamine residue, chemical resistance or mechanical characteristic of the polyimide or the polyimide precursor to an electrolytic solution or a base deteriorates. When the mechanical strength decreases, a film may be fractured by stress due to a change in volume of an active material, leading to peeling of the active material. On the other hand, when the amount of the tetracarboxylic dianhydride residue is more than 0.95 mole based on 1 mole of the diamine residue, the density of an amino group existing at the end may decrease, leading to weak effect of improving first time efficiency. Furthermore, when the amount of the tetracarboxylic dianhydride residue increases to 1.0 moles or more based on 1 mole of the diamine residue 1 mole, an acid may remain at the end of the polyimide and thus become likely to trap lithium ions, leading to a decrease in initial efficiency. The amount of the acid residue is preferably from 0.91 to 0.95 mole, more preferably from 0.91 to 0.945 mole, and still more preferably from 0.91 to 0.94 mole, based on 1 mole of the diamine residue.

In addition to the tetracarboxylic acid residue, a tricarboxylic acid residue or a dicarboxylic acid residue is contained, the total content of these acid residues is adjusted within a range from 0.90 to 0.95 mole based on 1 mole of the diamine residue.

In the present invention, the content of the tetracarboxylic acid residue and the diamine residue in the binder can be calculated from charge amounts of the tetracarboxylic anhydride and the diamine used for the production of the polyimide or the polyimide precursor. It is possible to use, as the method in which the content of the tetracarboxylic acid residue and the content of the diamine residue are measured from the obtained polyimide or polyimide precursor, the following method. First, a polyimide or a polyimide precursor is hydrolyzed by a heat treatment in an aqueous tetramethylammonium hydroxide solution at a temperature of 100 to 300° C. The contents of the tetracarboxylic acid residue and diamine residue can be determined by analyzing the hydrolyzed sample using liquid chromatography, gas chromatography, NMR, or GC-MS in which mass spectrometry is combined with gas chromatography.

The number average molecular weights of the polyimide and polyimide precursor can be calculated from the loading amounts of the tetracarboxylic anhydride and the diamine used for the production of the polyimide or the polyimide precursor. The number average polymerization degree is decided by the loading amount, and the number average molecular weight can be calculated by multiplying one unit of the molecular weight. The number average polymerization degree to be calculated from a ratio of 0.90 to 0.95 moles of a tetracarboxylic anhydride to 1 mole of a diamine 1 mole falls within a range from 10 to 20. Regarding the method in which the number average molecular weight is measured from the obtained polyimide or polyimide precursor, the measurement can be performed by a GPC method (polystyrene standards) using, as an eluent, N-methylpyrrolidone (NMP) containing phosphoric acid and lithium chloride in each concentration of 0.05 mole/L added therein.

The binder of the present invention contains the above polyimide and/or polyimide precursor. The binder may contain only one kind or two or more kinds of them. The binder may contain, in addition to these resins, resins discomposable at comparatively low temperature, such as SBR, polyethylene glycol, and polypropylene glycol. In the below-mentioned method for producing an electrode, such low-temperature decomposable resin is decomposed by a heat treatment, and thus making it possible to obtain an electrode including pores existing therein. A ratio of the total amount of the polyimide and polyimide precursor to the low-temperature decomposable resin is preferably within a range from 100:1 to 50:50 in terms of a weight ratio.

The binder of the present invention may further contain a surfactant, a viscosity adjuster and the like, if necessary. Examples of the viscosity adjuster include carboxymethyl cellulose, hydroxyethyl cellulose, hydroxypropyl cellulose and the like. The binder may also contain a silane coupling agent such as aminopropyltrimethoxysilane, trimethoxyvinylsilane or trimethoxyglycidoxysilane, a triazine-based compound, a phenanthroline-based compound, a triazole-based compound and the like in the amount of 0.1 to 10 parts by weight based on 100 parts by weight of the total amount of the polyimide and polyimide precursor. Inclusion of these compounds enables a further increase in adhesion to an active material or a metal foil.

Next, a method for producing a binder of the present invention will be described.

In the case of a poly(amic acid), it is common to use a method in which diamine is dissolved in a solvent such as N-methylpyrrolidone (NMP), N,N-dimethylformamide (DMF), N,N-dimethylacetamide (DMAC), γ-butyrolactone (GBL), or dimethyl sulfoxide (DMSO) and then the obtained solution is reacted by adding a tetracarboxylic dianhydride. The reaction temperature is commonly from −20° C. to 100° C., and preferably from 0° C. to 50° C. The reaction time is commonly from 1 minute to 100 hours, and preferably from 2 hours to 24 hours. It is preferred to prevent moisture from entering into a system by allowing nitrogen to flow during the reaction.

In the case of a poly(amic acid) ester, tetracarboxylic dianhydride is mixed with an alcohol such as ethanol, propanol, or butanols, and a base catalyst such as pyridine or triethylamine, and then the mixture is reacted at room temperature to 100° C. for about several minutes to 10 hours to obtain a dicarboxylic acid diester compound. In this case, the tetracarboxylic dianhydride may be directly mixed with the alcohol, or the alcohol may be mixed with the base catalyst after dissolving the tetracarboxylic dianhydride in a solvent such as NMP, DMAC, DMF, DMSO, or GBL. The obtained dicarboxylic acid diester is heat-treated in thionyl chloride or reacted with oxalodichloride to obtain a dicarboxylic acid chloride diester. The obtained dicarboxylic acid chloride diester is collected by a technique such as distillation, and then a solution prepared by dissolving diamine in a solvent such as NMP, DMAC, DMF, DMSO, or GBL in the presence of pyridine or triethylamine. It is preferred that the solution is dropwise added at −20° C. to 30° C. After dropwise addition, a reaction is performed at −20° C. to 50° C. for 1 hour to 100 hours to obtain a poly(amic acid) ester.

Since a hydrochloride is produced as a by-product when using a dicarboxylic acid dichloride diester, the dicarboxylic acid diester is preferably reacted with diamine by a condensing reagent of peptide, such as dicyclohexylcarbodiimide instead of heat-treating the dicarboxylic acid diester in thionyl chloride or reacting with oxalodichloride. It is also possible to obtain a poly(amic acid) ester by reacting the above-described poly(amic acid) with an acetal compound such as dimethylformamide dialkyl acetal. The esterification rate can be adjusted by the additive amount of the acetal compound.

In the case of a polyisoimide, the polyisoimide can be obtained by dehydration ring-closing of a poly(amic acid) using dicyclocarbodiimide, trifluoroacetic anhydride or the like.

In the case of a polyimide, the polyimide can be obtained by imide ring-closing of a polyimide precursor selected from the above poly(amic acid), poly(auric acid) ester and polyisoimide through a heat treatment or a chemical treatment. Examples of the chemical treatment include a treatment with acetic anhydride and pyridine, a base treatment with triethylamine, dodecylundecene or the like, and an acid anhydride treatment with acetic anhydride, succinic anhydride or the like.

In the case of a polyamideimide, it is common to use a method in which diamine is dissolved in a solvent such as NMP, DMF, DMAC, GBL, or DMSO and then the obtained solution is reacted by adding a tricarboxylic acid. The reaction temperature is commonly from −20° C. to 100° C., and preferably from 0° C. to 50° C. The reaction time is commonly from 1 minute to 100 hours, and preferably from 2 hours to 24 hours. It is preferred to prevent moisture from entering into a system by allowing nitrogen to flow during the reaction. Common reaction includes a method in which a diamine solution is reacted with tricarboxylic acid chloride, followed by a heat treatment at 100° C. to 300° C. for 1 minute to 24 hours to obtain a polyamideimide. In this case, the reaction can be accelerated by adding, as a catalyst for imidation, an acid anhydride such as acetic anhydride, or a base such as triethylamine, pyridine or picoline in the amount of 0.1 to 10% by weight based on the amount of a polymer. It is also possible to obtain a polyamideimide by polymerizing a diamine with a trimellitic anhydride chloride in the presence of pyridine, triethylamine or the like, and then the polymer is taken out in the form of a solid and the solid is heated at a temperature of 100 to 300° C. for 1 minute to 24 hours. It is also possible to obtain a polyamideimide by converting an amino group of a diamine compound into an isocyanate, followed by a reaction with tricarboxylic acid, optionally, in the presence of a tin-based catalyst at a temperature within a range from room temperature to 200° C. for 1 minute to 24 hours.

When the binder contains two or more kinds of polyimides or polyimide precursors, or further contains a low-temperature decomposable resin, these materials may be mixed by a known method. When the binder contains additives such as a surfactant, a viscosity adjuster, a silane coupling agent, a triazine-based compound, a phenanthroline-based compound, and a triazole-based compound, these additives may be added to the binder, or these additives may be added to the below-mentioned binder solution.

The binder of the present invention may also be used as a solution after dissolving in a solvent. Regarding the range of concentration and that of the viscosity of the binder solution, the concentration is preferably within a range from 1 to 50% by weight and the viscosity is preferably within a range from 1 mPa·second to 1,000 Pa·second, and the concentration is more preferably within a range from 5 to 30% by weight and the viscosity is more preferably within a range from 100 mPa·second to 100 Pa·second.

Examples of the solvent used in the binder solution include NMP, DMAC, DMF, DMSO, GBL, propylene glycol dimethyl ether, ethyl lactate, cyclohexanone, tetrahydrofuran and the like. For the purpose of improving coatability of the binder solution, the binder solution can also preferably contain solvents such as propylene glycol monomethyl ether acetate, various alcohols, methyl ethyl ketone, and methyl isobutyl ketone in the amount of 1 to 30% by weight in the whole solvent. In the present invention, the binder alone refers to a solid component excluding a solvent.

Next, a paste for a lithium ion battery negative electrode of the present invention will be described.

The paste for a lithium ion battery negative electrode (hereinafter may be referred to as a paste for a negative electrode) of the present invention contains a binder of the present invention, and a lithium ion battery negative electrode active material containing one or more atoms selected from a silicon atom, a tin atom and a germanium atom. Such negative electrode active material has large charging/discharging capacity per unit volume and is useful for the enlargement of the capacity of a battery. The paste may contain two or more kinds of these negative electrode active materials.

Examples of the negative electrode active material having a silicon atom include (1) silicon, (2) an alloy of tin, nickel, copper, iron, cobalt, manganese, zinc, indium, silver, titanium, germanium, bismuth, antimony or chromium with silicon, (3) a compound of boron, nitrogen, oxygen or carbon with silicon, and an alloy or compound further containing metals exemplified in (2). An example of the alloy or compound of silicon includes $SiB_4$, $SiB_6$, $Mg_2Si$, $Ni_2Si$, $TiSi_2$, $MoSi_2$, $CoSi_2$, $NiSi_2$, $CaSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v$ ($0<v\leq2$) or $LiSiO$.

Examples of the negative electrode active material having a tin atom include (1) an alloy of silicon, nickel, copper, iron, cobalt, manganese, zinc, indium, silver, titanium, germanium, bismuth, antimony or chromium with tin, (2) a compound of oxygen or carbon with tin, and an alloy or compound further containing metals exemplified in (1). An example of the alloy or compound of tin includes $SnO_w$ ($0<w\leq2$), $SnSiO_3$, $LiSnO$ or $Mg_2Sn$.

Examples of the negative electrode active material having a germanium atom include an alloy of silicon or tin with germanium.

The negative electrode active material is preferably in the form of particles, and an average particle diameter thereof is preferably from 0.1 to 20 μm. A treatment with a silane coupling agent may be applied to a surface of the negative electrode active material.

In the paste for a negative electrode of the present invention, the content of the binder is preferably 1 part by weight or more based on 100 parts by weight of the negative electrode active material, and thus enabling a further improvement in adhesion. The content of the binder is more preferably 3 parts by weight or more, and still more preferably 5 parts by weight or more. In order to lower electric resistance and to increase the loading amount of the negative electrode active material, the content of the binder is preferably 20 parts by weight or less, and more preferably 15 parts by weight or less.

In order to lower electric resistance, the paste for a negative electrode of the present invention may contain conductive particles such as graphite, ketjen black, carbon nano-tube, and acetylene black. The content of these conductive particles is preferably 0.1 part by weight or more and 20 parts by weight or less based on 100 parts by weight of the negative electrode active material.

The paste for a negative electrode of the present invention can be obtained by kneading a binder of the present invention, the above negative electrode active material and, if necessary, additives such as a surfactant, a solvent, and a crosslinking agent. It is possible to use a planetary mixer, a three-roll, a ball mill, a homogenizer and the like for kneading. Two or more kinds of these means may be used in combination.

Next, the method for producing a lithium ion battery negative electrode (hereinafter may referred to as a negative electrode) will be described by way of examples. A paste for a negative electrode is applied on a metal foil in a thickness of 1 to 100 μm to obtain a negative electrode. A copper foil is commonly used as the metal foil. A method such as a screen printing, roll coating or slit coating method can be used for application.

When a polyimide precursor is used as a binder, a polyimide precursor is converted into a polyimide by a heat treatment at 100 to 500° C. for 1 minute to 24 hours after coating, and thus a negative electrode with reliability can be obtained. The heat treatment is preferably performed at 200 to 450° C. for 30 minutes to 20 hours. When a polyimide is used as the binder, the solvent is preferably removed by a heat treatment at 100 to 500° C. for 1 minute to 24 hours after coating. Since there is no need to perform imidation, a heat treatment is more preferably performed at 120° C. to 300° C. for 10 minutes to 24 hours. In any case, it is preferred to heat in an inert gas such as a nitrogen gas, or in vacuum so as to suppress mixing of moisture.

When the binder contains a low-temperature decomposable resin, a negative electrode including pores existing therein can be obtained by decomposing a low-temperature decomposable resin through a heat treatment. In this case, it is preferred that the heat treatment is preferably at a temperature which is higher than a decomposition temperature of a low-temperature decomposable resin and is lower than a decomposition temperature of a binder. Specifically, the heat treatment is preferably a heat treatment at 300 to 450° C. for 30 minutes to 20 hours.

Next, a lithium ion battery will be described. The lithium ion battery can be obtained by interposing a separator between a lithium ion battery positive, electrode (hereinafter may be referred to as a positive electrode) and a negative electrode obtained by the present invention, and injecting a polar organic solvent therebetween. The polar organic solvent fulfils the role of a medium capable of transferring ions involved in an electrochemical reaction of the battery. Examples of the polar organic solvent include carbonate-based, ester-based, ether-based, ketone-based, and alcohol-based aprotic solvents. Examples of the carbonate-based solvent include dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethyl methyl carbonate (EMC), ethylene carbonate (EC), propylene carbonate (PC), butylene carbonate (BC) and the like. Examples of the ester-based solvent include methyl acetate, ethyl acetate, n-propyl acetate, methyl propionate, ethyl propionate, γ-butyrolactone, decanolide, valerolactone, mevalonolactone, caprolactone and the like. Examples of the ether-based solvent include dibutyl ether, tetraglyme, diglyme, dimethoxyethane, 2-methyltetrahydrofuran, tetrahydrofuran and the like. Examples of the ketone-based solvent include cyclohexanone and the like. Examples of the alcohol-based solvent include ethyl alcohol, isopropyl alcohol and the like. Examples of the aprotic solvent include nitriles such as acetonitrile; amides such as dimethylformamide; dioxolanes such as 1,3-dioxolane; sulfolanes and the like. Two or more kinds of these solvents may be used. When two or more kinds of solvents are mixed, the content ratio can be appropriately selected according to performances of the objective battery. For example, in the case of the carbonate-based solvent, a cyclic carbonate and a chain carbonate are preferably used in combination in a volume ratio of 1:1 to 1:9, and thus enabling an improvement in performances of an electrolytic solution.

EXAMPLES

The present invention will be described in more detail below by way of Examples, but the present invention is not limited to the following Examples. Characteristics in the respective Examples were evaluated by the following procedures.

(1) Evaluation of Charge/Discharge Characteristics of Lithium Ion Battery

Using an HS cell (manufactured by Hohsen Corporation), a lithium ion battery was assembled and then charge/discharge characteristics were evaluated. The lithium ion battery was assembled under a nitrogen atmosphere. In the cell, a circle having a diameter of 16 mm punched out from a negative electrode produced in Example, a circle having a diameter of 24 mm, as a separator, obtained by punching out from a porous film (manufactured by Hohsen Corporation), and a circle having a diameter of 16 mm, as a positive electrode, which is obtained by punching out from an aluminum foil obtained by firing an active material made of lithium cobaltate (manufactured by Hohsen Corporation) were sequentially laid one upon another, and 1 mL of MIRET 1 (manufactured by Mitsui Chemicals, Inc.), as an electrolytic solution, was injected into the cell, followed by sealing to obtain a lithium ion battery.

The lithium ion battery thus obtained was charged at a constant current of 6 mA until a battery voltage reaches 4.2 V, and then discharged at a constant voltage of 4.2 V until the discharging time reaches 2 hours and 30 minutes in total from the beginning of charging. After pausing for 30 minutes, charging/discharging on the first cycle was performed by discharging at a constant current of 6 mA until a battery voltage reaches 2.7 V. This charging/discharging on the first cycle efficiency is called initial efficiency. The charging/discharging efficiency is the value obtained by dividing the amount of discharge by the amount of charge. Thereafter, charging/discharging was performed 5 cycles in total by repeating charging/discharging four times under similar conditions. This charging/discharging efficiency on the fifth cycle is called efficiency after 5 cycles.

(2) Synthesis of Negative Electrode Active Material

Sixty grams (60 g) of a natural graphite having a particle diameter of about 10 μm (CBF1, manufactured by Fuji Graphite Industry Co., Ltd.), 20 g of a nano silicon powder (manufactured by Aldrich, Inc.) and 10 g of carbon black (3050, manufactured by Mitsubishi Chemical Corporation) were mixed, well dispersed in a ball mill at 600 rpm for 12 hours and then vacuum-dried at 80° C. for 12 hours to obtain a Si—C based negative electrode active material.

Abbreviations of compounds in Examples and Comparative Examples are as follows.

NMP: N-methyl-2-pyrrolidone (manufactured by Mitsubishi Chemical Corporation)
PDA: p-phenylenediamine (manufactured by Tokyo Chemical Industry Co., Ltd.)
DABA: 4,4'-diaminobenzanilide (manufactured by WAKAYAMA SEIKA KOGYO Co., LTD.)
PMDA: pyromellitic anhydride (manufactured by Daicel Corporation)
BTDA: 3,3',4,4'-benzophenonetetracarboxylic dianhydride (manufactured by Daicel Corporation)
BPDA: 3,3',4,4'-biphenyltetracarboxylic dianhydride (manufactured by Mitsubishi Chemical Corporation)
DAE: 4,4'-diaminodiphenyl ether (manufactured by WAKAYAMA SEIKA KOGYO Co., LTD.)
APDS: 1,3-bis(3-aminopropyl)tetramethyldisiloxane (manufactured by Dow Corning Toray Co., Ltd.)

Example 1

In a well-dried four-necked separable flask, 19.22 g (96.0 mmoles) of DAE and 0.99 g (4.0 mmoles) of APDS were dissolved in 150 g of NMP under a nitrogen atmosphere. To the solution, 10.03 g (46.0 mmoles) of PMDA and 14.82 g (46.0 mmoles) of BTDA were added together with 30.2 g of NMP, followed by stirring while cooling so as not to reach 50° C. or higher. After stirring at 40° C. for 4 hours, a poly(amic acid) A solution (having a solid component concentration of 20% by weight) was obtained.

The thus obtained negative electrode active material (10.8 g) was mixed with 6 g of the poly(amic acid) A solution. The mixture was passed through a three-roll three times to obtain a paste for a negative electrode. This paste for a negative electrode was applied on an electrolytic copper foil (HLPB, manufactured by Nippon Mining & Metals Co., Ltd.) in a thickness of 25 µm using a doctor blade. The electrolytic copper foil coated with the paste for a negative electrode was heated in an inert oven (INH-9, manufactured by KOYO THERMO SYSTEMS CO., LTD.) at 80° C. for 1 hour while allowing nitrogen to flow so as to adjust the concentration of oxygen to 20 ppm or less, followed by temperature rise to 350° C. at 3.5° C./minute and further heating (firing) at 350° C. for 1 hour to obtain a negative electrode. Upon reaching the temperature inside the oven of 50° C. or lower, the negative electrode was taken out of the oven.

Initial efficiency was measured by the above procedure and found to be 74%. Efficiency after 5 cycles was 68%.

Example 2

In a well-dried four-necked separable flask, 19.22 g (96.0 mmoles) of DAE and 0.99 g (4.0 mmoles) of APDS were dissolved in 150 g of NMP under a nitrogen atmosphere. To the solution, 10.25 g (47.0 mmoles) of PMDA and 15.30 g (47.5 mmoles) of BTDA were added together with 34.0 g of NMP, followed by stirring while cooling so as not to reach 50° C. or higher. After stirring at 40° C. for 4 hours, a poly(amic acid) B solution (having a solid component concentration of 20% by weight) was obtained.

In the same manner as in Example 1, a negative electrode was produced. Initial efficiency was measured by the above procedure and found to be 73%. Efficiency after 5 cycles was 65%.

Example 3

In a well-dried four-necked separable flask, 19.22 g (96.0 mmoles) of DAE and 0.99 g (4.0 mmoles) of APDS were dissolved in 150 g of NMP under a nitrogen atmosphere. To the solution, 9.92 g (45.5 mmoles) of PMDA and 15.00 g (45.0 mmoles) of BTDA were added together with 30.5 g of NMP, followed by stirring while cooling so as not to reach 50° C. or higher. After stirring at 40° C. for 4 hours, a poly(amic acid) C solution (having a solid component concentration of 20% by weight) was obtained.

In the same manner as in Example 1, a negative electrode was produced. Initial efficiency was measured by the above procedure and found to be 74%. Efficiency after 5 cycles was 68%.

Comparative Example 1

In the same manner as in Example 1, except that the amount of PMDA was changed from 10.03 g (46.0 mmoles) to 10.47 g (48.0 mmoles), the amount of BTDA was changed from 14.82 g (46.0 mmoles) to 15.47 g (48.0 mmoles), and the amount of NMP added after the addition of the acid component was changed from 30.2 g to 34.6 g, a poly(amic acid) D solution (having a solid component concentration of 20% by weight) and a negative electrode were produced. Initial efficiency was measured by the above procedure and found to be 72%. Efficiency after 5 cycles was 62%.

Comparative Example 2

In the same manner as in Example 1, except that the amount of PMDA was changed from 10.03 g (46.0 mmoles) to 9.60 g (44.0 mmoles), the amount of BTDA was changed from 14.82 g (46.0 mmoles) to 14.18 g (44.0 mmoles), and the amount of NMP added after the addition of the acid component was changed from 30.2 g to 30.0 g, a poly(amic acid) E solution (having a solid component concentration of 20% by weight) and a negative electrode were produced. Initial efficiency was measured by the above procedure and found to be 74%. Efficiency after 5 cycles was 25%.

Example 4

In a well-dried four-necked separable flask, 19.22 g (96.0 mmoles) of DAE and 0.99 g (4.0 mmoles) of APDS were dissolved in 150 g of NMP under a nitrogen atmosphere. To the solution, 10.03 g of PMDA and 14.82 g of BTDA were added together with 39.7 g of NMP, followed by stirring while cooling so as not to reach 50° C. or higher. After stirring at 40° C. for 1 hour, 2.37 g (16.0 mmoles) of phthalic anhydride was added, followed by stirring at 40° C. for 3 hours to obtain a poly(amic acid) F solution (having a solid component concentration of 20% by weight).

In the same manner as in Example 1, a negative electrode was produced. Initial efficiency was measured by the above procedure and found to be 72%. Efficiency after 5 cycles was 62%.

Example 5

In a well-dried four-necked separable flask, 10.01 g (50.0 mmoles) of DAE and 5.41 g (50.0 mmoles) of PDA were dissolved in 120 g of NMP under a nitrogen atmosphere. To the solution, 27.65 g (94.0 mmoles) of BPDA was added together with 52.2 g of NMP, followed by stirring while cooling so as not to reach 50° C. or higher. After stirring at 40° C. for 4 hours, a poly(amic acid) G solution (having a solid component concentration of 20% by weight) was obtained.

In the same manner as in Example 1, a negative electrode was produced. Initial efficiency was measured by the above procedure and found to be 74%. Efficiency after 5 cycles was 68%.

Comparative Example 3

In the same manner as in Example 5, except that the amount of BPDA was changed from 27.65 g (94.0 mmoles) to 30.01 g (102.0 mmoles), and the amount of NMP added after the addition of the acid component was changed from 48.6 g to 38.0 g, a poly(amic acid) H solution (having a solid component concentration of 20% by weight) and a negative electrode were produced. In the same manner as in Example 1, the evaluation was performed. As a result, initial efficiency was 68%. Efficiency after 5 cycles was 40%.

Example 6

In a well-dried four-necked separable flask, 10.01 g (50.0 mmoles) of DAE and 11.36 g (50.0 mmoles) of DABA were dissolved in 150 g of NMP under a nitrogen atmosphere. To the solution, 27.65 g (94.0 mmoles) of BPDA was added together with 46.1 g of NMP, followed by stirring while cooling so as not to reach 50° C. or higher. After stirring at 40° C. for 4 hours, a poly(amic acid) I solution (having a solid component concentration of 20% by weight) was obtained.

In the same manner as in Example 1, a negative electrode was produced. Initial efficiency was measured by the above procedure and found to be 74%. Efficiency after 5 cycles was 67%.

Comparative Example 4

In the same manner as in Example 6, except that the amount of BPDA was changed from 27.65 g (94.0 mmoles) to 25.01 g (85.0 mmoles), and the amount of NMP added after the addition of the acid component was changed from 46.1 g to 35.5 g, a poly(amic acid) J solution (having a solid component concentration of 20% by weight) and a negative electrode were produced. In the same manner as in Example 1, the evaluation was performed. As a result, initial efficiency was 74%. Efficiency after 5 cycles was 20%.

Compositions and evaluation results of Examples 1 to 6 and Comparative Examples 1 to 4 are shown in Table 1.

INDUSTRIAL APPLICABILITY

Use of the binder for a lithium ion battery electrode of the present invention may enable an improvement in initial efficiency of a lithium ion battery. Particularly, even in the case of using a negative electrode active material containing one or more atoms selected from a silicon atom, a tin atom and a germanium atom, high initial efficiency can be obtained.

The invention claimed is:

1. A lithium ion battery negative electrode, comprising a negative electrode active material and a polyimide containing a tetracarboxylic acid residue and a diamine residue, wherein the tetracarboxylic acid residue is a dianhydride residue of a tetracarboxylic dianhydride, said tetracarboxylic dianhydride represented by the following general formula (1) and/or said tetracarboxylic dianhydride represented by the following general formula (2), wherein the diamine residue is a residue of a diamine, said diamine represented by the following general formula (3) and/or said diamine represented by the following general formula (4):

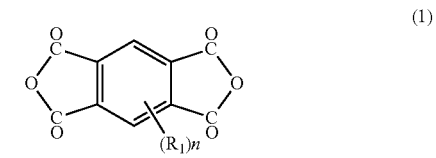

(1)

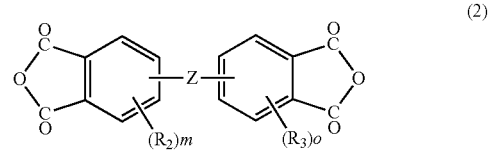

(2)

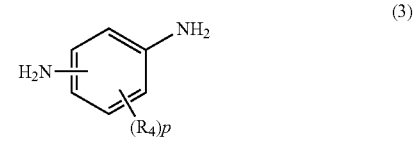

(3)

TABLE 1

| | Acid anhydride 1 | Molar ratio | Acid anhydride 2 | Molar ratio | Diamine 1 | Molar ratio | Diamine 2 | Molar ratio | Number of moles of acid dianhydride component based on 1 mole of diamine component | Initial efficiency (%) | Efficiency after 5 cycles (%) |
|---|---|---|---|---|---|---|---|---|---|---|---|
| Example 1 | PMDA | 46 | BTDA | 46 | DAE | 96 | APDS | 4 | 0.92 | 74 | 68 |
| Example 2 | PMDA | 47 | BTDA | 47.5 | DAE | 96 | APDS | 4 | 0.945 | 73 | 65 |
| Example 3 | PMDA | 45.5 | BTDA | 45.5 | DAE | 96 | APDS | 4 | 0.91 | 74 | 68 |
| Comparative Example 1 | PMDA | 48 | BTDA | 48 | DAE | 96 | APDS | 4 | 0.96 | 72 | 62 |
| Comparative Example 2 | PMDA | 44 | BTDA | 44 | DAE | 96 | APDS | 4 | 0.88 | 74 | 25 |
| Example 5 | BPDA | 94 | — | — | DAE | 50 | PDA | 50 | 0.94 | 74 | 68 |
| Comparative Example 3 | BPDA | 102 | — | — | DAE | 50 | PDA | 50 | 1.02 | 68 | 40 |
| Example 6 | BPDA | 94 | — | — | DAE | 50 | DABA | 50 | 0.94 | 74 | 67 |
| Comparative Example 4 | BPDA | 85 | — | — | DAE | 50 | DABA | 50 | 0.85 | 74 | 20 |

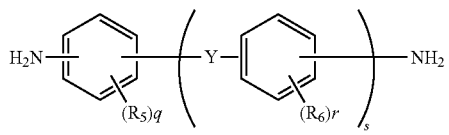 (4)

wherein Y represents a group selected from an amide group and an ether group; n is 0; m and o are 0; p, q and r are 0; and s is an integer of from 1 to 4,
- wherein the content of the tetracarboxylic acid residue is from 0.91 to 0.94 moles based on one mole of the diamine residue,
- wherein the number average polymerization degree of the polyimide before heat treatment is from 10 to 20,
- wherein z is a direct bond or a carbonyl group, and
- wherein an amino group is formed at an end of the polyimide.

2. The lithium ion battery negative electrode according to claim 1, wherein the polyimide contains a dianhydride residue of a tetracarboxylic dianhydride represented by the aforementioned general formula (2).

3. The lithium ion battery negative electrode according to claim 1, wherein the negative electrode active material is a negative electrode active material containing one or more atoms selected from a silicon atom and a germanium atom.

4. The lithium ion battery negative electrode according to claim 1, wherein the content of the polyimide is 1 part by weight or more based on 100 parts by weight of the negative electrode active material.

5. The lithium ion battery negative electrode according to claim 1, wherein the negative electrode active material contains a silicon atom.

6. The lithium ion battery negative electrode according to claim 1, wherein the negative electrode further comprises conductive particles selected from the group comprising graphite, ketjen black, carbon nanotube, and acetylene black.

7. A lithium ion battery comprising a lithium ion battery negative electrode according to claim 1, a separator, a positive electrode, and a polar organic solvent.

* * * * *